United States Patent Office 3,456,059
Patented July 15, 1969

3,456,059
N₁-[2 - (p-HYDROXYPHENYL)ETHYL]BIGUANIDE AS A HYPOGLYCEMIC AGENT AND AS A WEIGHT REDUCING AGENT
Arne N. Wick, La Jolla, and Patrick J. Murphy, Los Angeles, Calif., assignors to San Diego State College Foundation, San Diego, Calif., a non-profit corporation of California
No Drawing. Filed July 9, 1965, Ser. No. 470,927
Int. Cl. A61k 27/00; C07c 129/12
U.S. Cl. 424—326                        11 Claims

ABSTRACT OF THE DISCLOSURE $N_1$-[2-(p-hydroxyphenyl)ethyl] biguanide, and pharmaceutically acceptable salts thereof, useful as lowering the blood sugar level in animals and reducing the weight in animals when orally administered. A method of reducing weight in animals and lowering the blood sugar level of animals by orally administering said compounds.

---

This invention relates to novel hydroxy biguanides and hypoglycemic agents, to a process for the production thereof, and to pharmaceutically acceptable compositions containing the same.

The advent of orally administrable hypoglycemic agents has substantially reduced the inconvenience and emotional stress resulting from the daily use of injectables, such as insulin, in the treatment of the hyperglycemia associated with diabetes mellitus. The need for aseptic injection conditions has been obviated. The problems of storage stability and uncertainty of dosage control, particularly with the use of insulin suspensions, have been substantially eliminated. Hypoglycemic agents which can be administered orally and which are known to lower the blood sugar level of diabetics include $N_1$-phenylethylbiguanide.

The advantages of an oral hypoglycemic agent (over injectable insulin) have been recognized heretofore in U.S. Patents 2,961,377 and 3,059,029 which are directed to biguanides, certain substituted biguanides and their substantially non-toxic salts. The present invention is directed to the discovery that hydroxylated forms of such substituted biguanides are more effective, of lower toxicity and enlarge the field of utility of the parent compounds.

We have found that certain hydroxy aralkyl biguanides and particularly $N_1$-[2-(p-hydroxyphenyl)ethyl]-biguanide have the property of lowering the level of blood sugar in both diabetic and non-diabetic animals and are thus particularly useful as hypoglycemic agents. Tests show that this compound lowers the level of blood sugar in experimental animals to about the same extent as does $N_1$-phenylethylbiguanide. Furthermore, studies in experimental animals have indicated the compound to be approximately one-half as toxic as $N_1$-phenylethylbiguanide on an $LD_{50}$ test; and to differ from the latter compound in that the compound of this invention permits the cellular oxygen uptake of Ehrlich acites tumor cell preparations. We have found also that animals placed on a weight-gaining diet including our compounds did not gain as much weight as those fed on similar diets devoid of our compounds, thus indicating their utility as weight reducers.

We have isolated $N_1$-[2-(p-hydroxyphenyl)ethyl]-biguanide, both in the free phenolic form and the glucuronide thereof, from the urine of experimental animals, such as rats, to which $N_1$-phenylethylbiguanide had been administered orally.

It is therefore a general object of this invention to disclose and provide novel hydroxy aralkyl biguanides useful as chemical compounds in themselves and as chemical intermediates.

It is another object of this invention to disclose and provide novel hydroxy aralkyl biguanides and pharmaceutically acceptable salts thereof useful as hypoglycemic agents.

It is another object of this invention to provide an efficient and economic process for producing hydroxy aralkyl biguanide compounds, and pharmaceutically acceptable salts thereof, useful as hypoglycemic agents.

It is another object of this invention to provide an efficient and economic process for producing hydroxy aralkyl biguanide compounds.

It is a further object of this invention to disclose and provide a composition of matter containing hydroxy aralkyl biguanides for use as an orally administrable hypoglycemic agent.

It is an additional object of this invention to provide a method for lowering the level of sugar in the blood.

In general, the present invention provides novel compounds selected from the group consisting of biguanides having the formula

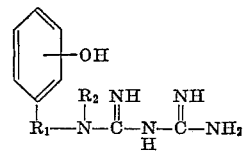

and their salts, wherein $R_1$ is lower alkylene and $R_2$ is selected from the group consisting of hydrogen and lower alkyl. The terms "lower alkyl" and "lower alkylene" as used herein are meant to include $C_1$ to $C_6$ alkyl and alkylene.

The preferred biguanides are selected from those having the formula

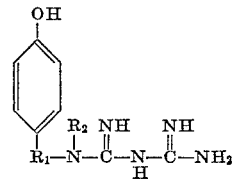

and their pharmaceutically acceptable salts, wherein $R_1$ and $R_2$ have the same meaning as above, the most preferred being those in which $R_1$ is ethyl and $R_2$ is hydrogen, and in which $R_1$ is methylene and $R_2$ is methyl.

The hydroxy aralkyl biguanides of the present invention are strong bases and consequently are preferably used in the form of their salts. They form stable salts with organic and inorganic acids. The biguanides can also be made and used in the form of acid addition salts derived by reaction with inorganic acids, including hydrochloric, sulfuric, nitric, phosphoric and hydrobromic acids as well as with organic acids, including acetic, tartaric, lactic, malic, glycolic, amino and sulfonic acids. The hypoglycemic activity of the salt form of the compounds is attributable to the free base but the salt component affects the solubility and absorption characteristics of the compound.

In accordance with our process the biguanides of the present invention may be prepared in the form of the salts by reacting an hydroxy aralkylamine salt with a guanidine-type compound, such as dicyandiamide, at a temperature above about 100° C., preferably in the range of about 125–135° C., and under acidic pH conditions, preferably at a pH range of 4 to 5. For example, $N_1$-[2-p-hydroxyphenyl)ethyl]-biguanide hydrochloride is prepared by reacting tyramine hydrochloride with a slight excess of dicyandiamide at a temperature of 125–135° C. and a pH of 4 to 5. Instead of isolating the compound as the hydrochloride, it can be converted, if desired, to the free base by treatment with an equivalent amount of a strong alkali. The free $N_1$-[2-(p-hydroxyphenyl)ethyl]-biguanide may be converted to a pharmaceutically acceptable salt by the addition thereto of an equivalent amount of the desired acid. The salts may also be conveniently prepared by treating the hydrochloride of $N_1$-[2-(p-hydroxyphenyl)ethyl]-biguanide with an equivalent quantity of the silver salt of the preferred acid.

Other suitable methods for preparing biguanides, such as those described and referred to in the above-mentioned patents, may be used if desired. For example, the biguanides may be prepared by fusion of equivalent quantities of an appropriate amine hydrochloride and dicyandiamide for one-half to three hours at 120–200° C. and isolated from the fusion mixture by recrystallization. Where the hydrochloride is obtainable only with difficulty or in poor yield, the treatment of an aqueous solution of the fusion mixture with an excess of aqueous sodium nitrate causes precipitation of the less soluble substituted biguanide-nitric acid salt, which can be purified. Alternatively, alkalinization and cooling of an aqueous solution of the fusion mixture with sodium hydroxide precipitates the biguanide as the free base which can be separated and purified by recrystallization and converted to the salt desired by reaction with stoichiometric amounts of acid.

Another method for preparing the biguanides involves isolation and purification through the biguanide copper complex salt and subsequent removal of the copper by precipitation with hydrogen sulfide. The compounds may also be prepared by hydroxylation of the appropriate parent compounds referred to above, for example, by first converting such compounds to halide derivatives and subsequently hydroxylating.

The compounds of this invention are desirably made up into orally administrable compositions or capsules containing from about 1.0 mg. to 500 mg. of the active ingredient in dosage unit form, combined with the usual extenders, fillers and lubricants. Alternatively, the compositions can be formulated as aqueous solutions or elixirs.

The invention will appear more fully from the examples which follow, which are set forth by way of illustration only; and it is to be understood that it is here intended to cover all changes and modifications of the examples herein which do not constitute departures from the spirit and scope of the invention.

EXAMPLE I $N_1$-[2-(p-hydroxyphenyl)ethyl]-biguanide hydrochloride 400 gms. tyramine hydrochloride (2.18 moles), 194.5 gms. dicyandiamide (2.31 moles) and 77.3 cc. $H_2O$ are added to a two liter flask fitted with a stirrer, an internal thermometer, a vapor thermometer and a condenser.

Water is removed until the internal temperature is about 129–132° C. The reaction mixture is kept at this temperature for three hours, concentrated hydrochloric acid being added periodically to maintain the pH between about 4–5. The solution is then cooled to room temperature and 1800 cc. acetonitrile added. The precipitate that formed is filtered, washed with acetonitrile and then recrystallized twice from 9:1 acetonitrile:water. The compound, thus prepared, melted at 182–184° C.

EXAMPLE II $N_1$-[2-(p-hydroxyphenyl)ethyl]-biguanide

An equivalent amount of sodium hydroxide in concentrated (about 28.5%) aqueous solution is added to $N_1$-[2-(p-hydroxyphenyl)ethyl]biguanide hydrochloride. The free base precipitates and is recrystallized twice from 9:1 acetonitrile:water; M.P. 120–123° C.

EXAMPLE III $N_1$-[2-p-hydroxyphenyl)ethyl]-biguanide nitrate

An equivalent quantity of silver nitrate is added to $N_1$-[2-(p-hydroxyphenyl)ethyl]-biguanide hydrochloride in aqueous solution. The precipitate of silver chloride is removed by filtration and the nitrate salt of the biguanide compound is recovered from the filtrate by removing the water under reduced pressure. The material melts at 121–126° C.

By following the procedure of Example III the phosphate, sulfate and acetate were similarly prepared.

Other pharmaceutically acceptable salts, such as, for example, the maleate, tartrate, citrate, succinate and malate, can be prepared by adding an equivalent amount of the desired acid to the free $N_1$-[2-(p-hydroxyphenyl)ethyl]-biguanide and isolating and recovering the salt in the conventional manner.

Examples IV and V describe the preparation of representative pharmaceutically acceptable compositions.

EXAMPLE IV

*Tablets*.—Twenty-five grams of $N_1$-[2-(p-hydroxyphenyl)ethyl]-biguanide hydrochloride, 48 gms. powdered sugar and 32 gms. starch are mixed and granulated with a 10% gelatin solution. The granulation is then dried and ground to fine granules for tabletting. About 1% magnesium stearate is first added as a lubricant together with sufficient corn starch to make a tablet of about 2.5 grains. The formulation is tabletted to give about 1,000 tablets containing about 25 mg. of the active ingredient per tablet.

EXAMPLE V

*Liquid (syrup)*.—Ten grams of $N_1$-[2-(p-hydroxyphenyl)ethyl]-biguanide hydrochloride are dissolved in 1 liter of water; 5 gms. sodium benzoate and 35 ml. liquid sugar are added and stirred until dissolved. Flavor, as desired, is added and water is added to volume to give a solution containing about 10 mg. of active ingredient per teaspoon.

We claim:

1. A compound from the group consisting of $N_1$-[2-(p-hydroxyphenyl)ethyl]-biguanide and its pharmaceutically acceptable salts.

2. $N_1$-[2-(p-hydroxyphenyl)ethyl]-biguanide.

3. $N_1$-[2-(p-hydroxyphenyl)ethyl]-biguanide hydrochloride.

4. $N_1$-[2-(p-hydroxyphenyl)ethyl]-biguanide nitrate.

5. A composition of matter adapted for use as an orally administrable hypoglycemic agent, containing as the essential active ingredient a hypoglycemic effective amount of a compound from the group consisting of $N_1$-[2-(p-hydroxyphenyl)ethyl]-biguanide and its pharmaceutically acceptable salts, said active ingredient being present in conjunction with an innocuous and non-toxic substance that is chemically inert with respect to said active ingredient and being in dosage unit form.

6. A composition of matter as defined in claim 5 wherein the essential active ingredient is $N_1$-[2-(p-hydroxyphenyl)ethyl]-biguanide hydrochloride.

7. A composition of matter as defined in claim 5 wherein the essential active ingredient is present in an amount from about 1.0 mg. to 500 mg. per dosage unit.

8. The method for lowering blood sugar in animals which comprises orally administering to said animal a composition containing as an essential active ingredient a compound from the group consisting of $N_1$-[2-(p-hydroxyphenyl)ethyl]-biguanide and its pharmaceutically acceptable salts, said oral administration being in an amount sufficient to lower the level of sugar in the blood.

9. The method according to claim 8 wherein the essential active ingredient is $N_1$-[2-(p-hydroxyphenyl)ethyl]-biguanide hydrochloride.

10. The method of reducing weight in animals which comprises orally administering to said animal a composition containing as an essential active ingredient a compound from the group consisting of $N_1$-[2-(p-hydroxyphenyl)ethyl]-biguanide and its pharmaceutically acceptable salts, said oral administration being in a weight reducing effective amount.

11. The method according to claim 10 wherein the essential active ingredient is $N_1$-[2-(p-hydroxyphenyl)ethyl]-biguanide hydrochloride.

References Cited

UNITED STATES PATENTS 2,371,111  3/1945  Sperry.
2,961,377  11/1960  Shapiro.
3,059,029  10/1962  Geiger.
3,098,008  7/1963  Shapiro _____ 167—55

OTHER REFERENCES

Noller, Chemistry of Organic Compounds, second edition, W. B. Saunders Company, Philadelphia, Pa., 1957, pp. 461–463.

Chemical Abstracts 67–115485 (p. 10869) (1967).

FRANK CACCIAPAGLIA, JR., Primary Examiner
J. GOLDBERG, Assistant Examiner

U.S. Cl. X.R.
260—564